May 9, 1950 W. C. TRAUTMAN 2,507,066
PRESSURE CONTROLLED SWITCH
Filed April 8, 1946 2 Sheets-Sheet 1
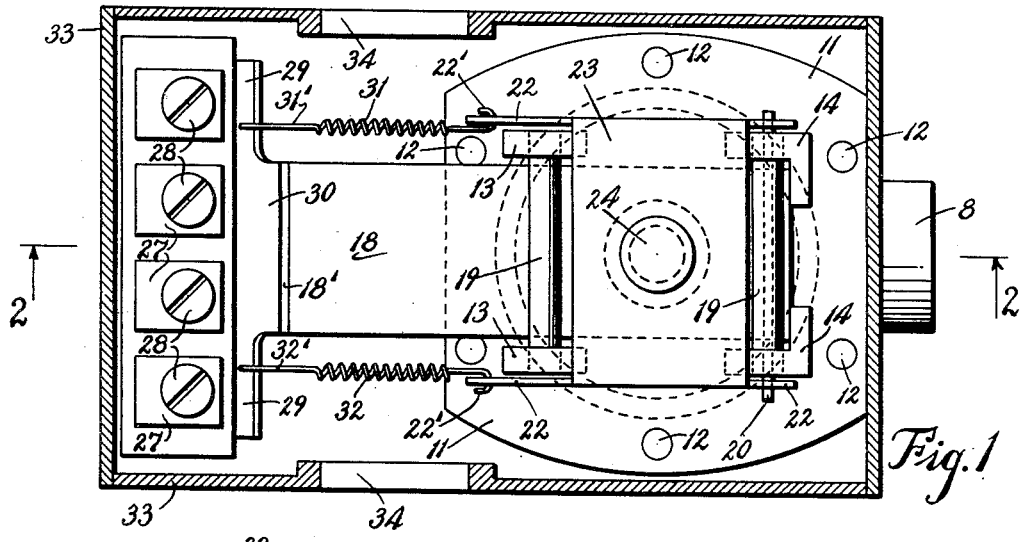
Fig.1
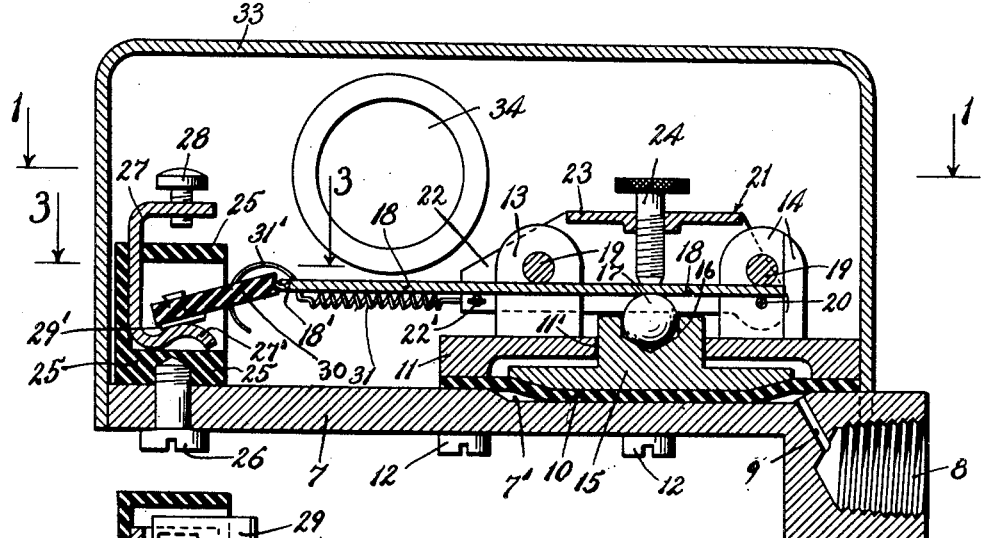
Fig.2
Fig.3
Inventor
Walter C. Trautman
By
Attorney May 9, 1950 W. C. TRAUTMAN 2,507,066
PRESSURE CONTROLLED SWITCH
Filed April 8, 1946 2 Sheets-Sheet 2
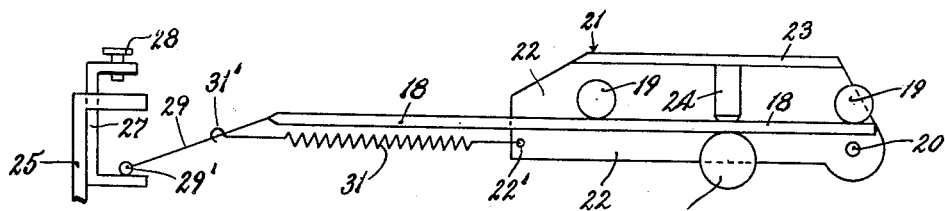
Fig. 4
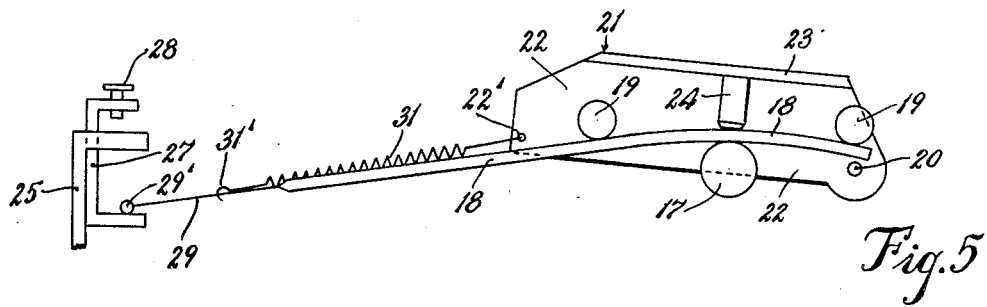
Fig. 5
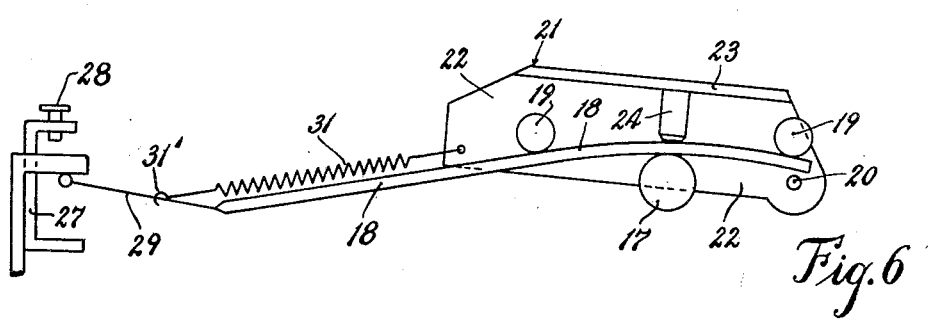
Fig. 6
Inventor
Walter C. Trautman
Attorney Patented May 9, 1950

2,507,066

UNITED STATES PATENT OFFICE 2,507,066

PRESSURE CONTROLLED SWITCH

Walter C. Trautman, Los Angeles, Calif.

Application April 8, 1946, Serial No. 660,341

3 Claims. (Cl. 200—83)

This invention relates to pressure controlled switches and particularly to fluid pressure in a system connected therewith whereby increased pressure operates to actuate said switch and to cut down or to cut off the electric energy which is causing said pressure, as where an electric motor is operating a pumping system, thus providing automatic means for controlling the power operating the fluid system.

Among the salient objects of this invention are:

To provide in connection therewith means for increasing the quickness of action of the snap switch elements when the pressure in the system increases beyond that for which it is normally set;

To provide in connection with such a mechanism, means whereby the increased pressure in the system operates to change the position of the pivot point of the spring element and thus reduce the amount of movement required in the main element to cause the action of the snap switch element;

To provide means in such a mechanism for adjusting it to require different pressures in order to actuate it, thus making it possible to set the mechanism for different predetermined pressures before actuation;

Other features of improvement and advantage will appear from the following more detailed description of one practical embodiment of my invention, taken with the accompanying two sheets of drawings, in which:

Figure 1 is a plan view looking down into a pressure controlled switch, embodying my invention, taken on the line 1—1 of Fig. 2;

Figure 2 is a vertical sectional view taken on the line 2—2 of Fig. 1;

Figure 3 is a fragmentary view taken on the line 3—3, Fig. 2;

Figures 4, 5 and 6 are diagrammatic views, showing the three different positions of the pressure actuated or controlled mechanism which causes the operation of the switch element.

Referring now in detail to the drawings, my invention as here shown for explanation, includes a base or body 7, having at one side means 8 for connecting a fluid inlet from a fluid pressure system thereto, with a port 9 therefrom. Said base or body 7 is provided with a relatively shallow area 7' therein, in which is laid a diaphragm, indicated to be of rubber, and designated 10.

Mounted upon said diaphragm 10, and clamping around its edges, is a body element 11, secured in place, as by means of screw bolts 12, 12, said body element 11 having a central opening therein and provided on its top with upstanding bearing lugs or members 13, 13, and 14, 14, the members 14, 14, being of angle form, as indicated.

Mounted upon the central part of said diaphragm 10 is a plunger or piston-like element 15, having its central portion extended upwardly through the opening 11' in the body element 11, as clearly indicated in Fig. 2. Said piston-like element 15 has a ball-receiving cavity in its top, designated 16, to hold a ball 17.

A leaf-type of load spring 18 rests upon said ball, and under two cross pins 19, 19, in the upstanding lugs or members 13 and 14, as clearly seen in Fig. 2.

Pivotally connected, as at 20, with the lugs or members 14, 14, is what I will call a saddle member 21, having the two opposite sides, 22, 22, and the top cross portion 23, said top cross member 21 being provided with an adjustment screw 24 having its lower end resting upon the spring member 18, over the ball, as clearly shown.

Mounted across the end of the base or body 7 is an insulated support, 25, secured to the base by screw bolts, as 26, and supported in this support are switch contact elements, as 27, having terminal screws, as 28, for connecting circuit wires (not shown), in a well known manner. Said switch contact elements 27 are spaced apart and their lower ends are shown with a hump 27' for live contact purposes, while their upper ends, carrying the terminal screws 28, are above the supporting member 25, made of insulating material, as indicated. I have shown two pairs of contact elements 27, 27, thus making provision for two circuits to be connected with their terminal screws 28, 28.

A snap switch element or body 29, also of insulating material is shown, and this is provided with connecting contact plates, as 29', 29', thereon, positioned to contact and connect two of said contact elements 27, 27, when in the down position, as indicated in Fig. 2, in engagement with the hump portion 27' of the members 27. When said snap switch element 29 is in the up position, it is in engagement with the top of said support 25, as indicated in Fig. 6.

Said snap switch element 29, in its middle portion, has a tongue extension 30, the end of which is provided with a V-shaped channel crosswise thereof, to receive the knife edge 18' of the leaf spring member 18, as clearly illustrated.

Two coiled springs, as 31 and 32, are shown connected at one end with the opposite sides, 22, 22, of the saddle member 21, as at 22', and at their other ends, said springs 31 and 32, are connected with the snap switch element 29, with circular hook-like portions 31' and 32', through holes in said switch element 29, as clearly illustrated.

A suitable box cover 33 is shown fitted over said mechanism and seated on the base or body 7, and secured in place in any desired manner, said cover having in its opposite sides suitable openings for the lead in wires or cables, as at 34.

It will be noted that the spring member 18 bears against the two rocker pins 19, 19, spaced equidistant from the center of the piston element 15 and the ball 17. This ball provides practically a frictionless contact with the spring member 18. When pressure through the piston 15, from the diaphragm 10, operates on said spring 18 between the pins, and causes it to be deflected or bowed, as seen in Figs. 5 and 6, it rocks on said pins 19, 19, and through the adjustment screw 24, the saddle member 21 is caused to be raised at one end, on its pivot 20, thus raising its opposite sides which are connected to the two springs 31 and 32, and raising their fulcrum connections above the member 18, as seen in Figs. 5 and 6, whereby to cause the snap action of said snap switch element 29 from the position shown in Fig. 2, and also in Figs. 4 and 5, to the position shown in Fig. 6.

Thus, by providing the pivoted saddle member 21, connected as it is, with the adjustment screw 24, I provide means for hastening the response of the snap switch member 29, with which it is connected by the coiled springs 31 and 32. As the pressure increases under the diaphragm 10 and raises the element 15 and the ball 17 to bow the load spring 18, the free end of said spring 18 is moved downwardly relative to the ends of the side members 22, 22, of said saddle 21. This will be seen by comparing Figs. 5 and 6, with Fig. 4, the bowed condition of said spring 18 necessarily causing this. Now, when the saddle 21 is raised by the pressure of the ball 17 on the adjustment screw 24, the fulcrum connection of the springs at 22', 22' is raised above the plane of said spring 18 as the end of the spring 18 is moved down, producing a quicker action of the snap switch element 29, and making the device quickly responsive to increased pressure on said load spring 18, and as quickly responsive to the reverse movement of said spring 18 when the pressure decreases to the predetermined adjustment. This new construction and arrangement provides for a much closer control of the pressure difference. This is accomplished by using the deflection of the spring 18 between the pins 19, 19, to actuate the saddle 21. By placing the pivot pin to the right and the tension spring anchoring holes to the left of the piston center, the upward movement of the leaf spring 18, between the rocker pins, is multiplied at the point of tension spring anchorage.

The adjustment screw 24 not only transfers the motion of the spring 18, between the rocker pins 19, 19, but also positions the axis of the saddle 21, and thereby functions as a pressure adjustment means. The angle of force application from the springs 131—32 to the saddle 21, is such as to produce a counterclockwise torque of the saddle about its pivot pin, at 20. This serves to keep the adjustment screw 24 firmly against the spring member 18 at all times and uses the tension of the springs 31—32 for this purpose. Thus it will be seen that a pressure adjustment can easily be made by the simple turning of said adjustment screw 24.

The ability to adjust the pressure-setting by changing the lightly loaded spaced relationships of several members is also important in that no critical manufacturing tolerances are required. I have found in practice that one full turn of the adjustment screw 24 is equivalent to twelve pounds per square inch difference in cutout pressure, and that adjustments to fifty pounds per square inch are not at all difficult to make. This provides sufficient adjustment sensitivity for all purposes.

While I have shown and described one practical embodiment of my invention, I am aware that changes in the details of construction and arrangement can be made without departing from the spirit thereof, and I do not, therefore, limit my invention to these details, except as I may be limited by the hereto appended claims.

I claim:

1. In a pressure control switch mechanism, a body having means for connecting a source of pressure fluid therewith, a movable member in said body, movable by increased pressure within said body, a spring member having two spaced bearings at one end and adapted to be moved by said movable member between said spaced bearings whereby to bow said spring member between said bearings and move its free end, a snap switch element pivotally connected end to end with the free end of said spring member, contact elements connected to be moved by said snap switch element for making and breaking a circuit, a coiled spring connected by one end to said snap switch element to bridge the pivotal connection between said snap switch and said spring member, an anchor member pivotally held by one end on said body with its free end connected with the other end of said spring, and adjustment means between said spring member and said anchor member, whereby the movement of said spring member between its bearings moves said anchor member and the end of said coiled spring connected therewith different distances.

2. In a pressure control switch mechanism, a body having means for connecting a source of pressure fluid therewith, said body having a chamber therein covered with a diaphragm to be moved by increased pressure in said chamber under said diaphragm, a movable member upon said diaphragm to be raised thereby, an elongated spring member having one end over said movable member with spaced bearings at said end, whereby movement of said movable member by said diaphragm bows said spring member between said bearings, and moves the free end of said spring member, switch elements operable by the movement of said free end of said spring member, to make and break a circuit, and adjustable means operable by the spring member between said bearings for regulating the movement of said switch elements.

3. In a pressure control switch mechanism, a body having means for connecting a source of pressure fluid therewith, said body having a chamber therein covered with a diaphragm to be moved by increased pressure in said chamber under said diaphragm, a movable member upon said diaphragm to be raised thereby, an elongated spring member having one end over said movable member with spaced bearings at said end, a ball on said movable member, in engagement with the under side of said elongated spring member between said bearings, whereby movement of said movable member bows said elongated spring member between said bearings and moves its free end, a snap switch element connected end to end with the other end of said spring member, a coiled spring connecting said snap switch element and bridging the connection between said snap switch element and said spring member, and movable means on said body connected with the other end of said coiled spring for moving the coiled spring to cause said snap switch element to move up and down, contact elements moved by said switch element for making and breaking a circuit, and means for adjusting the movable means on said body to regulate the movement of the connected end of said coiled spring.

WALTER C. TRAUTMAN.

REFERENCES CITED

The following references are of record in the file of this patent:

UNITED STATES PATENTS

| Number | Name | Date |
|---|---|---|
| 1,293,388 | Evans | Feb. 4, 1919 |
| 1,848,171 | Hanel | Mar. 8, 1932 |
| 2,281,544 | Beeman et al. | May 5, 1942 |
| 2,405,142 | Holt | Aug. 6, 1946 |